US012757297B2

(12) United States Patent
Thorsen

(10) Patent No.: US 12,757,297 B2
(45) Date of Patent: Oct. 6, 2026

(54) APPARATUS AND METHOD FOR HEATING SMOKABLE MATERIAL

(71) Applicant: NICOVENTURES TRADING LIMITED, London (GB)

(72) Inventor: Mitchel Thorsen, Madison, WI (US)

(73) Assignee: NICOVENTURES TRADING LIMITED, London (GB)

( * ) Notice: Subject to any disclaimer, the term of this patent is extended or adjusted under 35 U.S.C. 154(b) by 598 days.

(21) Appl. No.: 16/099,299

(22) PCT Filed: May 12, 2017

(86) PCT No.: PCT/EP2017/061526
§ 371 (c)(1),
(2) Date: Nov. 6, 2018

(87) PCT Pub. No.: WO2017/194769
PCT Pub. Date: Nov. 16, 2017

(65) Prior Publication Data

US 2020/0253280 A1 Aug. 13, 2020

(51) Int. Cl.
*A24F 40/46* (2020.01)
*H05B 3/46* (2006.01)
*A24F 40/57* (2020.01)

(52) U.S. Cl.
CPC ............... *H05B 3/46* (2013.01); *A24F 40/46* (2020.01); *A24F 40/57* (2020.01)

(58) Field of Classification Search
CPC ................................ A24F 40/46; A24F 40/57
See application file for complete search history.

(56) References Cited

U.S. PATENT DOCUMENTS

| | | | |
|---|---|---|---|
| 174,884 | A | 3/1876 | Wolff |
| 239,198 | A | 3/1881 | Simonds |
| 239,776 | A | 4/1881 | Henley |

(Continued)

FOREIGN PATENT DOCUMENTS

| | | | |
|---|---|---|---|
| CN | 86102917 | A | 11/1987 |
| CN | 1040914 | A | 4/1990 |

(Continued)

OTHER PUBLICATIONS

Sparkfun.com, "Alternating Current (AC) vs. Direct Current (DC)" tutorial, https://learn.sparkfun.com/tutorials/alternating-current-ac-vs-direct-current-dc/all, dated on Sep. 5, 2013 on GOOGLE.com, printed from the Internet on Mar. 9, 2023. (Year: 2013).*

(Continued)

*Primary Examiner* — Dionne W. Mayes
(74) *Attorney, Agent, or Firm* — Merchant & Gould P.C.

(57) ABSTRACT

An apparatus arranged to heat smokable material to volatilize at least one component of the smokable material is described. In an example, the apparatus comprises at least one thin-film heater constructed and arranged to heat smokable material contained in use within the apparatus. The thin-film heater has a plurality of heating regions for heating different portions of smokable material contained in use within the apparatus. At least a first heating region of the thin-film heater has a different watt density from at least a second heating region of the thin-film heater.

15 Claims, 4 Drawing Sheets

(56) References Cited

U.S. PATENT DOCUMENTS

| | | | |
|---|---|---|---|
| D22,270 | S | 3/1893 | Marshall |
| D27,458 | S | 8/1897 | Alexander |
| 844,272 | A | 2/1907 | Fate |
| 912,986 | A | 2/1909 | Aschenbrenner |
| 1,071,817 | A | 9/1913 | Stanley |
| 1,771,366 | A | 7/1930 | Wyss et al. |
| 1,886,391 | A | 11/1932 | Henri et al. |
| 1,927,956 | A | 9/1933 | Samuel et al. |
| 2,104,266 | A | 1/1938 | Mccormick |
| 2,371,557 | A | 3/1945 | Sullivan |
| 3,225,954 | A | 12/1965 | Herrick et al. |
| 3,265,236 | A | 8/1966 | Norman et al. |
| 3,804,100 | A | 4/1974 | Fariello |
| 3,805,806 | A | 4/1974 | Grihalva |
| 3,889,690 | A | 6/1975 | Guarnieri |
| D239,776 | S | 5/1976 | Kenjiro |
| 4,171,000 | A | 10/1979 | Uhle |
| 4,214,658 | A | 7/1980 | Crow |
| 4,303,083 | A | 12/1981 | Burruss, Jr. |
| 4,474,191 | A | 10/1984 | Steiner |
| 4,588,976 | A | 5/1986 | Jaselli |
| D284,506 | S | 7/1986 | Gutknecht |
| 4,628,187 | A | 12/1986 | Sekiguchi et al. |
| 4,638,820 | A | 1/1987 | Roberts et al. |
| 4,675,508 | A | 6/1987 | Miyaji et al. |
| 4,735,217 | A | 4/1988 | Gerth et al. |
| 4,756,318 | A | 7/1988 | Clearman et al. |
| 4,765,347 | A | 8/1988 | Sensabaugh, Jr. et al. |
| D303,766 | S | 10/1989 | Delbanco |
| 4,907,606 | A | 3/1990 | Lilja et al. |
| 4,922,901 | A | 5/1990 | Brooks et al. |
| 4,945,929 | A | 8/1990 | Egilmex |
| 4,945,931 | A | 8/1990 | Gori |
| 4,947,874 | A | 8/1990 | Brooks et al. |
| 4,947,875 | A | 8/1990 | Brooks et al. |
| 5,040,551 | A | 8/1991 | Schlatter et al. |
| 5,060,671 | A | 10/1991 | Counts et al. |
| 5,093,894 | A | 3/1992 | Deevi et al. |
| 5,095,921 | A | 3/1992 | Losee et al. |
| 5,144,962 | A | 9/1992 | Counts et al. |
| 5,179,966 | A | 1/1993 | Losee et al. |
| 5,190,060 | A | 3/1993 | Gerding et al. |
| 5,203,355 | A | 4/1993 | Clearman et al. |
| 5,224,498 | A | 7/1993 | Deevi et al. |
| 5,247,947 | A | 9/1993 | Clearman et al. |
| 5,249,586 | A | 10/1993 | Morgan et al. |
| 5,251,688 | A | 10/1993 | Schatz |
| 5,261,424 | A | 11/1993 | Sprinkel, Jr. |
| 5,269,327 | A | 12/1993 | Counts et al. |
| 5,271,980 | A | 12/1993 | Bell |
| 5,285,798 | A | 2/1994 | Banerjee et al. |
| 5,303,720 | A | 4/1994 | Banerjee et al. |
| 5,322,075 | A | 6/1994 | Deevi et al. |
| 5,327,915 | A | 7/1994 | Porenski et al. |
| 5,331,979 | A | 7/1994 | Henley |
| 5,345,951 | A | 9/1994 | Serrano et al. |
| 5,353,813 | A | 10/1994 | Deevi et al. |
| 5,369,723 | A | 11/1994 | Counts et al. |
| 5,388,594 | A | 2/1995 | Counts et al. |
| 5,402,803 | A | 4/1995 | Takagi |
| 5,408,574 | A | 4/1995 | Deevi et al. |
| D360,281 | S | 7/1995 | Kim |
| 5,468,936 | A | 11/1995 | Deevi et al. |
| 5,505,214 | A | 4/1996 | Collins et al. |
| 5,564,442 | A | 10/1996 | Macdonald et al. |
| 5,573,140 | A | 11/1996 | Satomi et al. |
| 5,613,504 | A | 3/1997 | Collins et al. |
| 5,613,505 | A | 3/1997 | Campbell et al. |
| 5,665,262 | A | 9/1997 | Hajaligol et al. |
| 5,771,845 | A | 6/1998 | Pistien et al. |
| 5,798,154 | A | 8/1998 | Bryan |
| 5,865,186 | A | 2/1999 | Volsey |
| 5,878,752 | A | 3/1999 | Adams et al. |
| 6,026,820 | A | 2/2000 | Baggett, Jr. et al. |
| D422,113 | S | 3/2000 | Higgins et al. |
| 6,037,568 | A | 3/2000 | Hatanaka et al. |
| 6,040,560 | A | 3/2000 | Fleischhauer et al. |
| D424,236 | S | 5/2000 | Reed |
| 6,089,857 | A | 7/2000 | Matsuura et al. |
| 6,125,853 | A | 10/2000 | Susa et al. |
| 6,155,268 | A | 12/2000 | Takeuchi |
| D437,112 | S | 2/2001 | Toffoli |
| D446,849 | S | 8/2001 | Weinberg |
| 6,315,366 | B1 | 11/2001 | Post et al. |
| 6,376,816 | B2 | 4/2002 | Cooper et al. |
| 6,868,230 | B2 | 3/2005 | Gerhardinger |
| D506,001 | S | 6/2005 | Christianson |
| D512,493 | S | 12/2005 | Haranaka |
| 6,994,096 | B2 | 2/2006 | Rostami et al. |
| D538,222 | S | 3/2007 | Curello et al. |
| D558,330 | S | 12/2007 | Chang |
| 7,374,063 | B2 | 5/2008 | Reid |
| D576,718 | S | 9/2008 | Nomi et al. |
| 7,624,739 | B2 | 12/2009 | Snaidr et al. |
| D634,417 | S | 3/2011 | Abbondanzio et al. |
| D634,832 | S | 3/2011 | Abbondanzio et al. |
| 7,913,688 | B2 | 3/2011 | Cross et al. |
| D643,732 | S | 8/2011 | Cummings et al. |
| 7,988,660 | B2 | 8/2011 | Byland et al. |
| D645,757 | S | 9/2011 | Milhem et al. |
| 8,061,361 | B2 | 11/2011 | Maeder et al. |
| D650,472 | S | 12/2011 | Petersen |
| 8,079,371 | B2 | 12/2011 | Robinson et al. |
| 8,081,474 | B1 | 12/2011 | Zohni et al. |
| D654,160 | S | 2/2012 | Yomtov |
| D663,891 | S | 7/2012 | Cohen Harel |
| D664,709 | S | 7/2012 | Almsberger et al. |
| D665,734 | S | 8/2012 | Fitch et al. |
| D674,479 | S | 1/2013 | Merchant et al. |
| D677,623 | S | 3/2013 | Fitch et al. |
| D677,774 | S | 3/2013 | Postma |
| 8,528,780 | B2 | 9/2013 | Houghton et al. |
| D695,396 | S | 12/2013 | Tani et al. |
| D696,815 | S | 12/2013 | Abroff |
| D700,397 | S | 2/2014 | Manca et al. |
| 8,678,013 | B2 | 3/2014 | Crooks et al. |
| D704,319 | S | 5/2014 | Cai |
| 8,757,404 | B1 | 6/2014 | Fleckenstein |
| D708,129 | S | 7/2014 | Houghton et al. |
| D708,727 | S | 7/2014 | Postma |
| 8,807,140 | B1 | 8/2014 | Scatterday |
| 8,833,364 | B2 | 9/2014 | Buchberger |
| D714,647 | S | 10/2014 | Kersten |
| D715,760 | S | 10/2014 | Kim et al. |
| D716,267 | S | 10/2014 | Kim et al. |
| D728,855 | S | 5/2015 | Liu |
| D729,440 | S | 5/2015 | Liu |
| D729,445 | S | 5/2015 | Leidel |
| D736,455 | S | 8/2015 | Liu |
| D740,673 | S | 10/2015 | Corradini et al. |
| D743,099 | S | 11/2015 | Oglesby |
| D743,889 | S | 11/2015 | Lyles et al. |
| D745,404 | S | 12/2015 | Julier et al. |
| D746,771 | S | 1/2016 | Perez |
| D758,656 | S | 6/2016 | Freshwater et al. |
| D759,296 | S | 6/2016 | Abroff et al. |
| D760,414 | S | 6/2016 | Brown et al. |
| 9,357,803 | B2 | 6/2016 | Egoyants et al. |
| 9,414,629 | B2 | 8/2016 | Egoyants et al. |
| D768,834 | S | 10/2016 | Schuller et al. |
| D771,867 | S | 11/2016 | Leidel et al. |
| D773,114 | S | 11/2016 | Leidel et al. |
| D775,762 | S | 1/2017 | Chen |
| 9,554,598 | B2 | 1/2017 | Egoyants et al. |
| D778,831 | S | 2/2017 | Chen |
| 9,609,894 | B2 | 4/2017 | Abramov et al. |
| D787,657 | S | 5/2017 | Farone et al. |
| D787,728 | S | 5/2017 | Wing et al. |
| D788,364 | S | 5/2017 | Chen |
| D807,575 | S | 1/2018 | Luo |
| D818,637 | S | 5/2018 | Ringel |
| D819,023 | S | 5/2018 | Shim |
| 9,980,523 | B2 | 5/2018 | Abramov et al. |
| D821,640 | S | 6/2018 | Qiu |

(56) References Cited

U.S. PATENT DOCUMENTS

| | | | |
|---|---|---|---|
| 9,999,256 | B2 | 6/2018 | Abramov et al. |
| D828,295 | S | 9/2018 | Li |
| D828,622 | S | 9/2018 | Chen et al. |
| D828,912 | S | 9/2018 | Powell et al. |
| D828,950 | S | 9/2018 | Gu |
| D828,953 | S | 9/2018 | Chen |
| D833,384 | S | 11/2018 | Takayanagi |
| 10,136,679 | B1 | 11/2018 | Shotey et al. |
| D835,857 | S | 12/2018 | Benacquisto et al. |
| D839,823 | S | 2/2019 | Lemelson et al. |
| D842,237 | S | 3/2019 | Qiu et al. |
| D842,243 | S | 3/2019 | Qiu |
| D843,052 | S | 3/2019 | Powell et al. |
| D848,603 | S | 5/2019 | Fujino et al. |
| D854,236 | S | 7/2019 | Qiu |
| D861,549 | S | 10/2019 | Lai |
| D869,086 | S | 12/2019 | Pan |
| D870,367 | S | 12/2019 | Chung et al. |
| D872,355 | S | 1/2020 | Powell et al. |
| D876,214 | S | 2/2020 | Yu |
| D881,458 | S | 4/2020 | Ouyang |
| D883,197 | S | 5/2020 | Doucet |
| D883,563 | S | 5/2020 | Pan |
| D884,266 | S | 5/2020 | Wang |
| D885,332 | S | 5/2020 | Han |
| D885,337 | S | 5/2020 | Xu |
| D885,651 | S | 5/2020 | Miyamoto |
| D888,326 | S | 6/2020 | Qiu |
| D888,329 | S | 6/2020 | Qiu |
| D889,740 | S | 7/2020 | Beer et al. |
| D891,692 | S | 7/2020 | Barbaric et al. |
| D892,124 | S | 8/2020 | Shim |
| D893,009 | S | 8/2020 | Choi |
| D894,476 | S | 8/2020 | Miyamoto |
| D897,596 | S | 9/2020 | Huang et al. |
| D898,990 | S | 10/2020 | Liu et al. |
| D898,991 | S | 10/2020 | Pan |
| 2002/0005207 | A1 | 1/2002 | Wrenn et al. |
| 2002/0079309 | A1 | 6/2002 | Cox et al. |
| 2003/0049025 | A1 | 3/2003 | Neumann et al. |
| 2003/0146224 | A1 | 8/2003 | Fujii et al. |
| 2004/0003820 | A1 | 1/2004 | Iannuzzi |
| 2004/0025865 | A1 | 2/2004 | Nichols et al. |
| 2004/0096204 | A1 | 5/2004 | Gerhardinger |
| 2004/0149296 | A1 | 8/2004 | Rostami et al. |
| 2004/0149297 | A1 | 8/2004 | Sharpe |
| 2004/0149737 | A1 | 8/2004 | Sharpe et al. |
| 2005/0063686 | A1 | 3/2005 | Whittle et al. |
| 2005/0199610 | A1 | 9/2005 | Ptaskienski |
| 2005/0211711 | A1 | 9/2005 | Reid |
| 2005/0268911 | A1 | 12/2005 | Cross et al. |
| 2006/0054616 | A1 | 3/2006 | Ptasienski et al. |
| 2007/0074734 | A1 | 4/2007 | Braunshteyn et al. |
| 2007/0102013 | A1 | 5/2007 | Adams et al. |
| 2007/0155255 | A1 | 7/2007 | Galauner et al. |
| 2007/0204858 | A1 | 9/2007 | Abelbeck |
| 2007/0204868 | A1 | 9/2007 | Bollinger et al. |
| 2007/0283972 | A1 | 12/2007 | Monsees et al. |
| 2008/0085139 | A1 | 4/2008 | Roof |
| 2008/0092912 | A1 | 4/2008 | Robinson et al. |
| 2008/0216828 | A1 | 9/2008 | Wensley et al. |
| 2008/0233318 | A1 | 9/2008 | Coyle |
| 2008/0302374 | A1 | 12/2008 | Wengert et al. |
| 2009/0032034 | A1 | 2/2009 | Steinberg |
| 2009/0056728 | A1 | 3/2009 | Baker |
| 2009/0114737 | A1 | 5/2009 | Yu et al. |
| 2009/0126745 | A1 | 5/2009 | Hon |
| 2009/0151717 | A1 | 6/2009 | Bowen et al. |
| 2009/0260641 | A1 | 10/2009 | Monsees et al. |
| 2009/0272379 | A1 | 11/2009 | Thorens et al. |
| 2009/0304372 | A1 | 12/2009 | Gubler et al. |
| 2010/0126516 | A1 | 5/2010 | Yomtov et al. |
| 2010/0200006 | A1 | 8/2010 | Robinson et al. |
| 2010/0236561 | A1 | 9/2010 | Barnes et al. |
| 2010/0242975 | A1 | 9/2010 | Hearn |
| 2010/0300467 | A1 | 12/2010 | Kuistila et al. |
| 2011/0094523 | A1 | 4/2011 | Thorens et al. |
| 2011/0108025 | A1 | 5/2011 | Fink et al. |
| 2011/0126848 | A1 | 6/2011 | Zuber et al. |
| 2011/0155153 | A1 | 6/2011 | Thorens et al. |
| 2011/0226236 | A1 | 9/2011 | Buchberger |
| 2011/0240047 | A1 | 10/2011 | Adamic |
| 2011/0264084 | A1 | 10/2011 | Reid |
| 2011/0290244 | A1 | 12/2011 | Schennum |
| 2012/0006342 | A1 | 1/2012 | Rose et al. |
| 2012/0255546 | A1 | 10/2012 | Goetz et al. |
| 2012/0260927 | A1 | 10/2012 | Liu |
| 2013/0037041 | A1* | 2/2013 | Worm et al. ............ A24F 40/46 131/329 |
| 2013/0042865 | A1 | 2/2013 | Monsees et al. |
| 2013/0081623 | A1 | 4/2013 | Buchberger |
| 2013/0306084 | A1 | 11/2013 | Flick |
| 2014/0060554 | A1 | 3/2014 | Collett |
| 2014/0069444 | A1 | 3/2014 | Cyphert et al. |
| 2014/0182608 | A1 | 7/2014 | Egoyants et al. |
| 2014/0182843 | A1 | 7/2014 | Vinegar |
| 2014/0196718 | A1 | 7/2014 | Li et al. |
| 2014/0202476 | A1 | 7/2014 | Egoyants et al. |
| 2014/0216485 | A1 | 8/2014 | Egoyants et al. |
| 2014/0270726 | A1 | 9/2014 | Egoyants et al. |
| 2014/0283825 | A1 | 9/2014 | Buchberger |
| 2014/0299125 | A1 | 10/2014 | Buchberger |
| 2014/0305449 | A1 | 10/2014 | Plojoux et al. |
| 2014/0326257 | A1 | 11/2014 | Jalloul et al. |
| 2014/0334802 | A1 | 11/2014 | Dubief |
| 2014/0338680 | A1 | 11/2014 | Abramov et al. |
| 2014/0360515 | A1* | 12/2014 | Vasiliev ................ A24F 47/008 131/329 |
| 2014/0366898 | A1 | 12/2014 | Monsees et al. |
| 2015/0040925 | A1 | 2/2015 | Saleem et al. |
| 2015/0053217 | A1 | 2/2015 | Steingraber et al. |
| 2015/0059787 | A1 | 3/2015 | Qiu |
| 2015/0101606 | A1 | 4/2015 | White |
| 2015/0101944 | A1 | 4/2015 | Li et al. |
| 2015/0181937 | A1* | 7/2015 | Dubief et al. .......... A24F 40/46 131/329 |
| 2015/0189919 | A1 | 7/2015 | Liu |
| 2015/0223520 | A1 | 8/2015 | Phillips et al. |
| 2015/0245658 | A1 | 9/2015 | Worm et al. |
| 2016/0003403 | A1 | 1/2016 | Smith |
| 2016/0007652 | A1 | 1/2016 | Taluskie et al. |
| 2016/0081395 | A1 | 3/2016 | Thorens et al. |
| 2016/0255879 | A1 | 9/2016 | Paprocki et al. |
| 2017/0119048 | A1 | 5/2017 | Kaufman et al. |
| 2017/0119049 | A1 | 5/2017 | Blandino et al. |
| 2017/0119050 | A1 | 5/2017 | Blandino et al. |
| 2017/0156406 | A1 | 6/2017 | Abramov et al. |
| 2017/0156407 | A1 | 6/2017 | Abramov et al. |
| 2017/0197043 | A1 | 7/2017 | Buchberger |
| 2017/0197044 | A1 | 7/2017 | Buchberger |
| 2017/0197046 | A1 | 7/2017 | Buchberger |
| 2017/0231276 | A1 | 8/2017 | Mironov et al. |
| 2017/0232211 | A1 | 8/2017 | Gallem et al. |
| 2018/0168224 | A1 | 6/2018 | Naughton et al. |
| 2018/0271151 | A1 | 9/2018 | Litten |
| 2018/0271153 | A1 | 9/2018 | John et al. |
| 2018/0271171 | A1 | 9/2018 | Abramov et al. |
| 2019/0029326 | A1 | 1/2019 | Qiu |
| 2019/0046745 | A1 | 2/2019 | Nettenstrom et al. |
| 2019/0150508 | A1 | 5/2019 | Thorsen et al. |
| 2019/0166918 | A1 | 6/2019 | Thorsen et al. |
| 2019/0200678 | A1 | 7/2019 | Thorson et al. |
| 2019/0208815 | A1 | 7/2019 | Thorsen |
| 2019/0208816 | A1 | 7/2019 | Thorsen |
| 2019/0208817 | A1 | 7/2019 | Qiu et al. |
| 2019/0246693 | A1 | 8/2019 | Nettenstrom et al. |
| 2019/0387799 | A1 | 12/2019 | Reevell |
| 2020/0245681 | A1 | 8/2020 | An |
| 2020/0345960 | A1 | 11/2020 | Begin et al. |

FOREIGN PATENT DOCUMENTS

| | | | |
|---|---|---|---|
| CN | 1045691 | A | 10/1990 |
| CN | 1122213 | A | 5/1996 |

(56) References Cited

FOREIGN PATENT DOCUMENTS

| | | | | |
|---|---|---|---|---|
| CN | 1126425 | A | 7/1996 | |
| CN | 2246744 | Y | 2/1997 | |
| CN | 1190335 | A | 8/1998 | |
| CN | 1196660 | A | 10/1998 | |
| CN | 1196661 | A | 10/1998 | |
| CN | 1333657 | A | 1/2002 | |
| CN | 2598364 | Y | 1/2004 | |
| CN | 1947462 | A | 4/2007 | |
| CN | 101044795 | A | 9/2007 | |
| CN | 101238047 | A | 8/2008 | |
| CN | 101267749 | A | 9/2008 | |
| CN | 101277622 | A | 10/2008 | |
| CN | 201185656 | Y | 1/2009 | |
| CN | 101557728 | A | 10/2009 | |
| CN | 201375023 | Y | 1/2010 | |
| CN | 101925309 | A | 12/2010 | |
| CN | 201869778 | U | 6/2011 | |
| CN | 102595943 | A | 7/2012 | |
| CN | 102753047 | A | 10/2012 | |
| CN | 103359550 | A | 10/2013 | |
| CN | 103763953 | A | 4/2014 | |
| CN | 103763954 | A | 4/2014 | |
| CN | 103974639 | A | 8/2014 | |
| CN | 104768407 | A | 7/2015 | |
| CN | 304659647 | | 6/2018 | |
| CN | 304659654 | | 6/2018 | |
| CN | 304691359 | | 6/2018 | |
| CN | 304696494 | | 6/2018 | |
| CN | 304724787 | | 7/2018 | |
| CN | 304840668 | | 10/2018 | |
| DE | 29713866 | U1 | 10/1997 | |
| DE | 19854005 | A1 | 5/2000 | |
| DE | 19854009 | A1 | 5/2000 | |
| EM | 0026114260001 | | 3/2015 | |
| EM | 0027270990001 | | 6/2015 | |
| EM | 0027270990007 | | 6/2015 | |
| EP | 0358002 | A2 | 3/1990 | |
| EP | 0358114 | A2 | 3/1990 | |
| EP | 0430559 | A2 | 6/1991 | |
| EP | 0430566 | A2 | 6/1991 | |
| EP | 0438862 | A2 | 7/1991 | |
| EP | 0488488 | A1 | 6/1992 | |
| EP | 0503767 | A1 | 9/1992 | |
| EP | 0603613 | A1 | 6/1994 | |
| EP | 0845220 | A1 | 6/1998 | |
| EP | 1618803 | A1 | 1/2006 | |
| EP | 1736065 | A1 | 12/2006 | |
| EP | 2022349 | A1 | 2/2009 | |
| EP | 2110033 | A1 | 10/2009 | |
| EP | 1947965 | B1 | 2/2010 | |
| EP | 2316286 | | 5/2011 | |
| EP | 2316286 | A1 | 5/2011 | |
| EP | 2327318 | A1 | 6/2011 | |
| EP | 2340729 | | 7/2011 | |
| EP | 2340729 | A1 | 7/2011 | |
| EP | 2340730 | A1 | 7/2011 | |
| EP | 2394520 | A1 | 12/2011 | |
| EP | 2520186 | A1 | 11/2012 | |
| EP | 2797448 | A2 | 11/2014 | |
| GB | 191000639 | A | 12/1910 | |
| GB | 191126138 | A | 3/1912 | |
| GB | 426247 | A | 3/1935 | |
| JP | S62501050 | A | 4/1987 | |
| JP | S63127399 | U | 8/1988 | |
| JP | H03192677 | A | 8/1991 | |
| JP | H03232481 | A | 10/1991 | |
| JP | H05212100 | A | 8/1993 | |
| JP | H0590161 | U | 12/1993 | |
| JP | H06189861 | A | 7/1994 | |
| JP | H06315366 | A | 11/1994 | |
| JP | H08942 | U | 6/1996 | |
| JP | H09107943 | A | 4/1997 | |
| JP | H1189551 | A | 4/1999 | |
| JP | H11125390 | A | 5/1999 | |
| JP | H11169157 | A | 6/1999 | |
| JP | 2001521123 | A | 11/2001 | |
| JP | 2003527127 | A | 9/2003 | |
| JP | 2005036897 | A | 2/2005 | |
| JP | 2005106350 | A | 4/2005 | |
| JP | 2005300005 | A | 10/2005 | |
| JP | 2006501871 | A | 1/2006 | |
| JP | 2008249003 | A | 10/2008 | |
| JP | 2009509521 | A | 3/2009 | |
| JP | 2009537120 | A | 10/2009 | |
| JP | 2010506594 | A | 3/2010 | |
| JP | 2010178730 | A | 8/2010 | |
| JP | 2010213579 | A | 9/2010 | |
| JP | 2011058538 | A | 3/2011 | |
| JP | 2011509667 | A | 3/2011 | |
| JP | 2013509160 | A | 3/2013 | |
| JP | 5193668 | B2 | 5/2013 | |
| JP | 2014519586 | A | 8/2014 | |
| JP | 2014524313 | A | 9/2014 | |
| JP | 2014525251 | A | 9/2014 | |
| JP | 2014533513 | A | 12/2014 | |
| JP | 2015521847 | A | 8/2015 | |
| JP | 2015524261 | | 2/2016 | |
| KR | 0178388 | B1 | 2/1999 | |
| KR | 19990081973 | A | 11/1999 | |
| KR | 20010089445 | A | 10/2001 | |
| KR | 100495099 | B1 | 11/2005 | |
| KR | 100636287 | B1 | 10/2006 | |
| KR | 100757450 | B1 | 9/2007 | |
| KR | 20080060218 | A | 7/2008 | |
| KR | 20100135865 | A | 12/2010 | |
| KR | 20120104533 | A | 9/2012 | |
| RU | 2600092 | C2 | 10/2016 | |
| WO | WO-8602528 | A1 | 5/1986 | |
| WO | WO 9219081 | | 10/1992 | |
| WO | WO-9219081 | A1 * | 10/1992 | ............... H05B 3/36 |
| WO | WO-9406314 | A1 | 3/1994 | |
| WO | WO-9418860 | A1 | 9/1994 | |
| WO | WO-9632854 | A2 | 10/1996 | |
| WO | WO-9741744 | A1 | 11/1997 | |
| WO | WO-9748295 | A1 | 12/1997 | |
| WO | WO-9823171 | A1 | 6/1998 | |
| WO | WO-9920939 | A1 | 4/1999 | |
| WO | WO-0027232 | A1 | 5/2000 | |
| WO | WO-0167819 | A1 | 9/2001 | |
| WO | WO-0170054 | A1 | 9/2001 | |
| WO | WO-03012565 | A1 | 2/2003 | |
| WO | WO-03037412 | A2 | 5/2003 | |
| WO | WO-03059413 | A2 | 7/2003 | |
| WO | WO-03070031 | A1 | 8/2003 | |
| WO | WO-03103387 | A2 | 12/2003 | |
| WO | WO-2007012007 | A2 | 1/2007 | |
| WO | WO-2007017482 | A1 | 2/2007 | |
| WO | WO-2007039794 | A2 | 4/2007 | |
| WO | WO-2007131450 | A1 | 11/2007 | |
| WO | WO-2008108889 | A1 | 9/2008 | |
| WO | WO-2008121610 | A1 | 10/2008 | |
| WO | WO-2009001082 | A1 | 12/2008 | |
| WO | WO-2009022232 | A2 | 2/2009 | |
| WO | WO-2009092862 | A1 | 7/2009 | |
| WO | WO-2010047389 | A1 | 4/2010 | |
| WO | WO-2010073018 | A1 | 7/2010 | |
| WO | WO-2010107613 | A1 | 9/2010 | |
| WO | WO-2010118644 | A1 | 10/2010 | |
| WO | WO-2010133342 | A1 | 11/2010 | |
| WO | WO-2011050964 | A1 | 5/2011 | |
| WO | WO-2011063970 | A1 | 6/2011 | |
| WO | WO-2011068020 | A1 | 6/2011 | |
| WO | WO-2011079932 | A1 | 7/2011 | |
| WO | WO-2013022936 | A1 | 2/2013 | |
| WO | WO-2013025921 | A1 | 2/2013 | |
| WO | WO-2013034454 | A1 | 3/2013 | |
| WO | WO-2013034458 | A1 | 3/2013 | |
| WO | WO-2013034459 | A1 | 3/2013 | |
| WO | WO-2013034460 | A1 | 3/2013 | |
| WO | WO-2013076098 | A2 | 5/2013 | |
| WO | WO-2013098395 | A1 | 7/2013 | |
| WO | WO-2013098396 | A2 | 7/2013 | |
| WO | WO-2013098397 | A2 | 7/2013 | |
| WO | WO-2013131764 | A1 | 9/2013 | |

(56) References Cited

FOREIGN PATENT DOCUMENTS

| | | | |
|---|---|---|---|
| WO | WO-2013160112 | A2 | 10/2013 |
| WO | 2014004648 | | 1/2014 |
| WO | WO-2014201432 | A1 | 12/2014 |
| WO | WO-2015062983 | A2 | 5/2015 |
| WO | WO-2015091258 | A1 | 6/2015 |
| WO | 2015166245 | | 11/2015 |
| WO | WO 2015166245 | A2 | 11/2015 |
| WO | WO-2015177254 | A1 | 11/2015 |
| WO | WO-2016012774 | A1 | 1/2016 |
| WO | WO-2016207407 | A1 | 12/2016 |
| WO | WO-2017194762 | A1 | 11/2017 |
| WO | WO-2017194763 | A2 | 11/2017 |
| WO | WO-2017194764 | A1 | 11/2017 |
| WO | WO-2017194766 | A1 | 11/2017 |
| WO | WO-2017194769 | A1 | 11/2017 |
| WO | WO-2018019786 | A1 | 2/2018 |

OTHER PUBLICATIONS

International Search Report , Application No. PCT/EP2017/061526, dated Aug. 2, 2017, 4 pages.
Application and File History for U.S. Appl. No. 29/676,726, filed Jan. 14, 2019, 98 pages, inventor(s): Powell et al.
Application and File History for U.S. Appl. No. 16/099,315, filed Nov. 6, 2018, Inventor: Thorsen, 222 pages.
Application and File History for U.S. Appl. No. 13/583,381, filed Dec. 17, 2012, inventor Buchberger.
Application and File History for U.S. Appl. No. 14/127,138, filed Feb. 10, 2014, inventors Egoyants et al.
Application and File History for U.S. Appl. No. 14/127,144, filed Mar. 31, 2014, inventors Egoyants et al.
Application and File History for U.S. Appl. No. 14/127,148, filed Mar. 12, 2014, inventors Egoyants et al.
Application and File History for U.S. Appl. No. 14/127,879, filed May 9, 2014, inventors Egoyants et al.
Application and File History for U.S. Appl. No. 14/343,368, filed Jun. 24, 2014, inventors Abramov et al.
Application and File History for U.S. Appl. No. 14/382,198, filed Aug. 29, 2014, inventors Saleem et al.
Application and Filing Receiptfor U.S. Appl. No. 29/557,914, filed Mar. 14, 2016, 280 pages, inventor(s): Powell et al.
Collier J.G. et al., "10.3 Mechanism of Evaporation and Condensation," Convective Boiling and Condensation, Third Edition, Clarendon Press, 1994, 6 pages.
Concept Group, "Insulon® Thermal Barrier from Concept Group Blocks Heat with Hyper-Deep Vacuum™," Dec. 15, 2011, 1 page.
Davies, et al., "Metallic Foams: Their Production, Properties and Applications," Journal of Materials Science, 1983, vol. 18(7), pp. 1899-1911.
Decision to Grant a Patent mailed Nov. 15, 2016 for Japanese Application No. 2015- 506185 filed Apr. 11, 2013, 5 pages.
Decision to Grant mailed Jan. 18, 2017 for Russian Application No. 2016503074, 4 pages.
English Translation of Office Action mailed Dec. 25, 2018 for Korean Application No. 10-2017-7037332, 7 pages.
Examination Report mailed Jan. 9, 2019 for Philippines Application No. 1/2016/500805, 6 pages.
Examination Report mailed Feb. 21, 2018 for Australian Application No. 2016204192, 7 pages.
First Office Action mailed Jun. 15, 2015 and Search Report mailed Jun. 2, 2015 for Chinese Application No. 201280029784.X, filed Aug. 24, 2012, 27 pages.
First Office Action mailed Dec. 3, 2015 for Chinese Application No. 201380021387.2, filed Apr. 11, 2011, 20 pages.
Glo E-cigarette, published 2016 [online], Available from Internet, URL: https://ifworlddesignguide.com/entry/235574-glo on retrieved Dec. 5, 2020, 4 pages.
U.S. Appl. No. 29/687,461, filed Apr. 12, 2019, 101 pages, inventor(s): Powell et al.
U.S. Appl. No. 29/687,464, filed Apr. 12, 2019, 101 pages, inventor(s): Powell et al.
U.S. Appl. No. 29/687,469, filed Apr. 12, 2019, 91 pages, inventor(s): Powell et al.
U.S. Appl. No. 29/687,471, filed Apr. 12, 2019, 91 pages, inventor(s): Powell et al.
Design U.S. Appl. No. 29/705,487, filed Sep. 12, 2019 inventor(s): Powell et al., 115 pages.
U.S. Appl. No. 15/737,673, filed Dec. 18, 2017, inventor(s): Thorsen et al., 205 pages.
International Preliminary Report on Patentability for Application No. PCT/EP2012/066484, mailed on Mar. 20, 2014, 7 pages.
International Preliminary Report on Patentability for Application No. PCT/EP2017/061518, mailed on Aug. 17, 2018, 16 pages.
International Preliminary Report on Patentability for Application No. PCT/EP2017/061519, mailed on Jul. 25, 2018, 22 pages.
International Preliminary Report on Patentability for Application No. PCT/EP2017/061526, mailed on Nov. 22, 2018, 10 pages.
International Preliminary Report on Patentability for Application No. PCT/EP2017/068675, mailed on Nov. 29, 2018, 7 pages.
International Preliminary Report on Patentability for International Application No. PCT/EP2017/061520, mailed on Jul. 17, 2018, 11 pages.
International Preliminary Report on Patentability for International Application No. PCT/EP2017/061523, mailed on Jul. 23, 2018, 14 pages.
International Preliminary Report on Patentability for Application No. PCT/EP2012/066486, mailed on Oct. 22, 2013, 10 pages.
International Preliminary Report on Patentability for Application No. PCT/EP2012/066523, mailed on Nov. 4, 2013, 9 pages.
International Preliminary Report on Patentability for Application No. PCT/EP2012/066524, mailed on Oct. 17, 2013, 11 pages.
International Search Report and Written Opinion for Application No. PCT/EP2013/057539, mailed on Feb. 11, 2014, 16 pages.
International Search Report and Written Opinion for Application No. PCT/EP2017/061519, mailed on Dec. 15, 2017, 22 pages.
International Search Report and Written Opinion for Application No. PCT/EP2017/061520, mailed on Sep. 11, 2017, 13 pages.
International Search Report and Written Opinion for Application No. PCT/EP2017/061523, mailed on Sep. 11, 2017, 13 pages.
International Search Report and Written Opinion for Application No. PCT/EP2017/068675, mailed on Nov. 9, 2017, 15 pages.
International Search Report and Written Opinion for Application No. PCT/EP2012/066484, mailed on Jan. 9, 2013, 9 pages.
International Search Report and Written Opinion for Application No. PCT/EP2012/066486, mailed on Jan. 14, 2013, 8 pages.
International Search Report and Written Opinion for Application No. PCT/EP2012/066523, mailed on Jan. 9, 2013, 9 pages.
International Search Report and Written Opinion for Application No. PCT/EP2012/066524, mailed on Jan. 9, 2013, 8 pages.
International Search Report and Written Opinion for Application No. PCT/EP2012/066525, mailed on Jan. 9, 2013, 10 pages.
International Search Report and Written Opinion for Application No. PCT/EP2012/066485, mailed on Dec. 10, 2012, 10 pages.
International Search Report and Written Opinion for Application No. PCT/AT2011/000123, mailed on Jul. 18, 2011, 8 pages.
International Search Report for Application No. PCT/EP2016/064756, mailed on Oct. 5, 2016, 2 pages.
International Search Report for Application No. PCT/EP2017/061518, mailed on Aug. 1, 2017, 4 pages.
National Plastic Heater, Sensor and Control Inc., "Kapton (Polyimide) Flexible Heaters," 2011, retrieved from https://www.kapton-silicone-flexible-heaters.com/products/kapton_polyimide_flexible_heaters.html on Feb. 23, 2018, 2 pages.
Notice of Opposition dated Mar. 7, 2017 for European Application No. 12750770.5, 22 pages.
Notice of Reasons for Refusal mailed Nov. 20, 2018 for Japanese Application No. 2017-567106, 6 pages.
Office Action mailed Jul. 8, 2016 for Chinese Application No. 201380021387.2, filed Apr. 11, 2011, 12 pages.
Office Action mailed Sep. 25, 2018 for European Application No. 12750765.5 filed Aug. 24, 2012, 22 pages.

(56) References Cited

OTHER PUBLICATIONS

Office Action mailed Sep. 26, 2018 for European Application No. 12750765.5 filed Aug. 24, 2012, 67 pages.
Office Action mailed Sep. 29, 2015 for Japanese Application No. 2015-506185 filed Apr. 11, 2013, 5 pages.
Office Action mailed Mar. 31, 2015 for Japanese Application No. 2014-519585 filed Aug. 24, 2012, 8 pages.
Office Action mailed Apr. 7, 2015 for Japanese Application No. 2014-519586 filed Aug. 24, 2012, 10 pages.
Office Action and Search Report mailed Apr. 27, 2015 for Chinese Application No. 201280030681.5, filed Aug. 24, 2012, 25 pages.
Office Action mailed Jan. 6, 2020 for Chinese Application No. 201680037678.4, 8 pages.
Office Action mailed Sep. 6, 2017 for Korean Application No. 10-2017-7017425, 9 pages.
Office Action mailed Sep. 6, 2017 for Korean Application No. 10-2017-7017430, 9 pages.
Office Action mailed Jan. 10, 2020 for Indian Application No. 201847042184, 5 pages.
Office Action mailed Mar. 10, 2020 for Japanese Application No. 2018-555932, 10 pages.
Office Action mailed Aug. 17, 2016 for Korean Application No. 10-2014-7032958, 13 pages.
Office Action mailed Aug. 17, 2020 for Chinese Application No. 201780028992.0, 13 pages.
Office Action mailed Feb. 18, 2020 for Japanese Application No. 2018-559712, 6 pages.
Office Action mailed Jul. 20, 2017 for Chilean Application No. 2014-002840, 7 pages.
Office Action mailed Apr. 24, 2019 for Chinese Application No. 201710413187.1, 16 pages.
Office Action mailed Feb. 25, 2020 for Japanese Application No. 2018-554526, 12 pages.
Office Action mailed Dec. 26, 2017 for Chinese Application No. 201480059966.0, 29 pages.
Office Action mailed Jul. 27, 2018 for Korean Application No. 10-2013-7033866, 22 pages.
Office Action mailed Jun. 27, 2017 for Japanese Application No. 2016-527295, 8 pages.
Office Action mailed Aug. 28, 2019 for Indian Application No. 201647014549, 6 pages.
Office Action mailed Jan. 28, 2020 for Japanese Application No. 2018-551932, 6 pages.
Office Action mailed Jul. 28, 2017 for Korean Application No. 10-2016-7010831, 11 pages.
Office Action mailed Jun. 28, 2019 for Russian Application No. 2018139838, 5 pages.
Office Action mailed dated Feb. 25, 2020 for Japanese Application No. 2018-554501, 12 pages.
Patio Kits Direct, "Insulated Roof Panels," DIY Alumawood Patio Cover Kits, dated Sep. 20, 2018, as available at https://www.patiokitsdirect.com/about-insulation, 2 pages.
Search Report mailed Mar. 24, 2015 for Chinese Application No. 201280029767.6 filed Aug. 24, 2012, 6 pages.
Search Report mailed Dec. 25, 2019 for Chinese Application No. 201680037678.4, 2 pages.
Second Office Action mailed Jan. 16, 2017 for Chinese Application No. 201380048636.7, 24 pages.
Translation of Office Action mailed Mar. 25, 2019 for Chinese Application No. 201610804046.8, 17 pages.
Uranaka T., et al., "British American Tobacco to Test Tobacco E-cigarette in Japan," Nov. 8, 2016, Retrieved from http://www.reuters.com/article/us-brit-am-tobacco-ecigarettes-idUSKBN1330AG on Apr. 7, 2017, 4 pages.
Warrier M., et al., "Effect of the Porous Structure of Graphite on Atomic Hydrogen Diffusion and Inventory," Nucl. Fusion, vol. 47, 2007, pp. 1656-1663.
Written Opinion for Application No. PCT/EP2012/066485, mailed on Oct. 15, 2013, 6 pages.
Written Opinion for Application No. PCT/EP2017/061526, mailed on Aug. 2, 2017, 8 pages.
Extended European Search Report received for European Patent Application No. 21165527.9, mailed on Jul. 23, 2021, 13 pages.
Reasons for Refusal received for Japanese Patent Application No. 2020-185087, mailed on Feb. 1, 2022, 8 pages (4 pages of English Translation and 4 pages of Official Copy).
Notice of Allowance, Japanese Patent Application No. 2023-164690, mailed on Jul. 7, 2025, 3 pages.

* cited by examiner

APPARATUS AND METHOD FOR HEATING SMOKABLE MATERIAL

PRIORITY CLAIM AND CROSS-REFERENCE TO RELATED APPLICATION

The present application is a National Phase entry of PCT Application No. PCT/EP2017/061526, filed May 12, 2017, which claims priority from U.S. Patent Application No. 62/336,262, filed May 13, 2016, each of which is hereby fully incorporated herein by reference. Reference is made to U.S. Provisional Patent Application No. 62/185,227, filed on Jun. 26, 2015, the entire content of which is incorporated herein by reference.

TECHNICAL FIELD

The present disclosure relates to an apparatus and a method for heating smokable material.

BACKGROUND

Articles such as cigarettes, cigars and the like burn tobacco during use to create tobacco smoke. Attempts have been made to provide alternatives to these types of articles, which burn tobacco, by creating products that release compounds without burning. Examples of such products are so-called heat-not-burn products, also known as tobacco heating products or tobacco heating devices, which release compounds by heating, but not burning, the material. The material may be for example tobacco or other non-tobacco products or a combination, such as a blended mix, which may or may not contain nicotine. Similarly, there are also so-called e-cigarette devices, which typically vaporize a liquid, which may or may not contain nicotine.

SUMMARY

According to a first aspect of the present disclosure, there is provided apparatus arranged to heat smokable material to volatilize at least one component of the smokable material, the apparatus comprising: at least one thin-film heater constructed and arranged to heat smokable material contained in use within the apparatus; the thin-film heater having a plurality of heating regions for heating different portions of smokable material contained in use within the apparatus, wherein at least a first heating region of the thin-film heater has a different watt density from at least a second heating region of the thin-film heater.

In some examples, this means that for example different portions of the smokable material can be heated to different temperatures. As another example, this means that a flatter, more uniform temperature profile can be achieved across at least part of or the whole of the smokable material.

In an embodiment, the watt density of the first heating region is less than the watt density of the second heating region, the first heating region being arranged towards a first end of the thin-film heater and the second heating region being arranged away from the first end of the thin-film heater.

In an embodiment, the first heating region has at least a first electrically conductive heating portion and the second heating region has at least a second electrically conductive heating portion, the electrical resistance of the first electrically conductive heating portion being different from the electrical resistance of the second electrically conductive heating portion.

In an embodiment, the cross-sectional area of the first electrically conductive heating portion is different from the cross-sectional area of the second electrically conductive heating portion.

In an embodiment, the first heating region has plural electrically conductive heating portions and the second heating region has plural electrically conductive heating portions, the electrical resistance of at least one of the electrically conductive heating portions of the first heating region being different from the electrical resistance of at least one of the electrically conductive heating portion of the second heating region.

In an embodiment, the electrically conductive heating portions of the first heating region are electrically connected in series with each other and the electrically conductive heating portions of the second heating region are electrically connected in series with each other.

In an embodiment, the thin-film heater has a non-heating region arranged generally centrally of the thin-film heater.

In an embodiment, the apparatus comprises a power supply which is arranged to provide the same voltage to the first heating region and the second heating region.

According to a second aspect of the present disclosure, there is provided a method of heating smokable material to volatilize at least one component of the smokable material using an apparatus, the apparatus comprising at least one heater constructed and arranged to heat smokable material contained in use within the apparatus, the heater having a plurality of heating regions for heating different portions of smokable material contained in use within the apparatus, wherein at least a first heating region of the heater has a different watt density from at least a second heating region of the heater; the method comprising: inserting smokable material into the apparatus; and operating the heater to provide different heat fluxes from the first heating region and the second heating region to different respective portions of the smokable material so that the different respective portions of the smokable material are heated to different temperatures.

In an embodiment, the apparatus comprises a power supply which provides the same voltage to the first heating region and the second heating region.

BRIEF DESCRIPTION OF THE DRAWINGS

Further features and advantages of the disclosure will become apparent from the following description of embodiments of the disclosure, given by way of example only, which is made with reference to the accompanying drawings.

DETAILED DESCRIPTION

As used herein, the term "smokable material" includes materials that provide volatilized components upon heating, typically in the form of an aerosol. “Smokable material” includes any tobacco-containing material and may, for example, include one or more of tobacco, tobacco derivatives, expanded tobacco, reconstituted tobacco or tobacco substitutes. “Smokable material” also may include other, non-tobacco, products, which, depending on the product, may or may not contain nicotine. “Smokable material” may for example be in the form of a solid, a liquid, a gel or a wax or the like. “Smokable material” may for example also be a combination or a blend of materials.

Apparatus is known that heats smokable material to volatilize at least one component of the smokable material, typically to form an aerosol which can be inhaled, without burning or combusting the smokable material. Such apparatus is sometimes described as a “heat-not-burn” apparatus or a “tobacco heating product” or “tobacco heating device” or similar. Similarly, there are also so-called e-cigarette devices, which typically vaporize a smokable material in the form of a liquid, which may or may not contain nicotine. The smokable material may be in the form of or provided as part of a rod, cartridge or cassette or the like which can be inserted into the apparatus. A heater for heating and volatilizing the smokable material may be provided as a “permanent” part of the apparatus or may be provided as part of the smoking article or consumable which is discarded and replaced after use. A “smoking article” in this context is a device or article or other component that includes or contains in use the smokable material, which in use is heated to volatilize the smokable material, and optionally other components.

Figure 1:
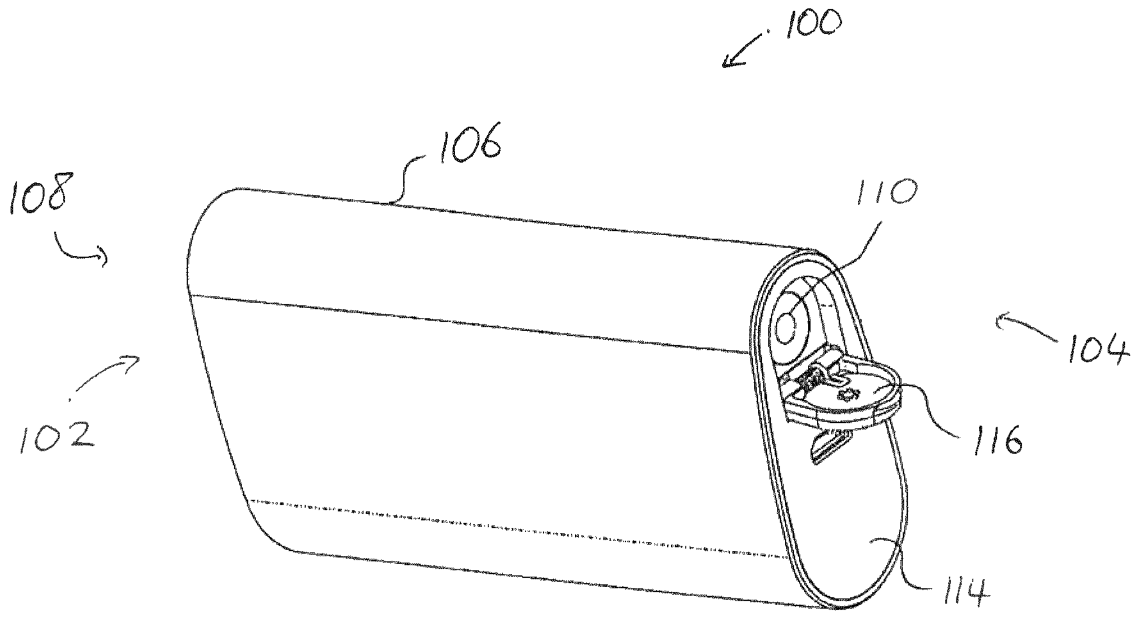
FIG. 1 shows a first perspective view of an example of an apparatus for heating smokable material.
Figure 2:
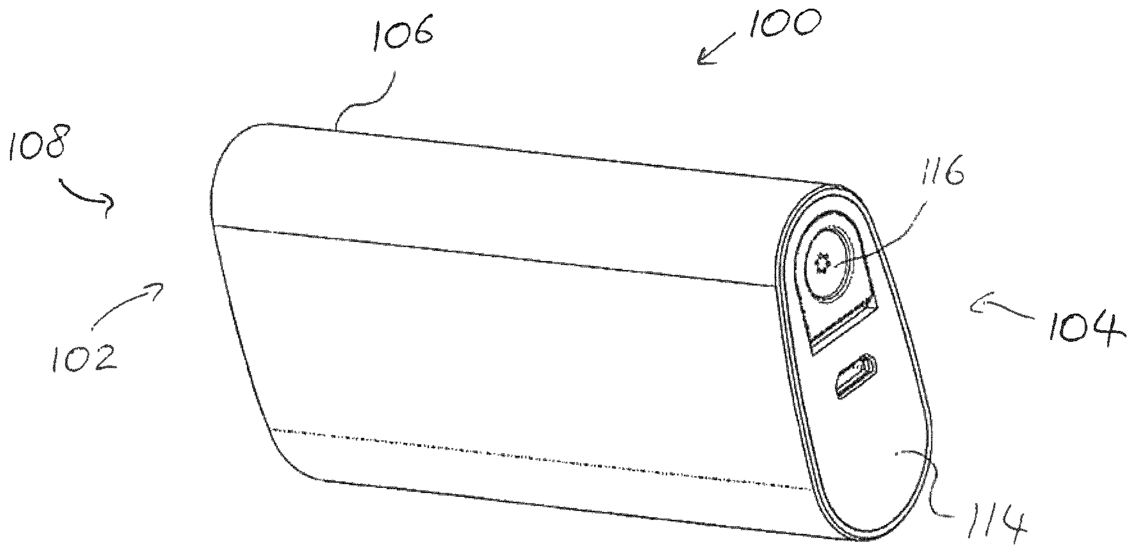
FIG. 2 shows a second perspective view of the apparatus of FIG. 1
Figure 3:
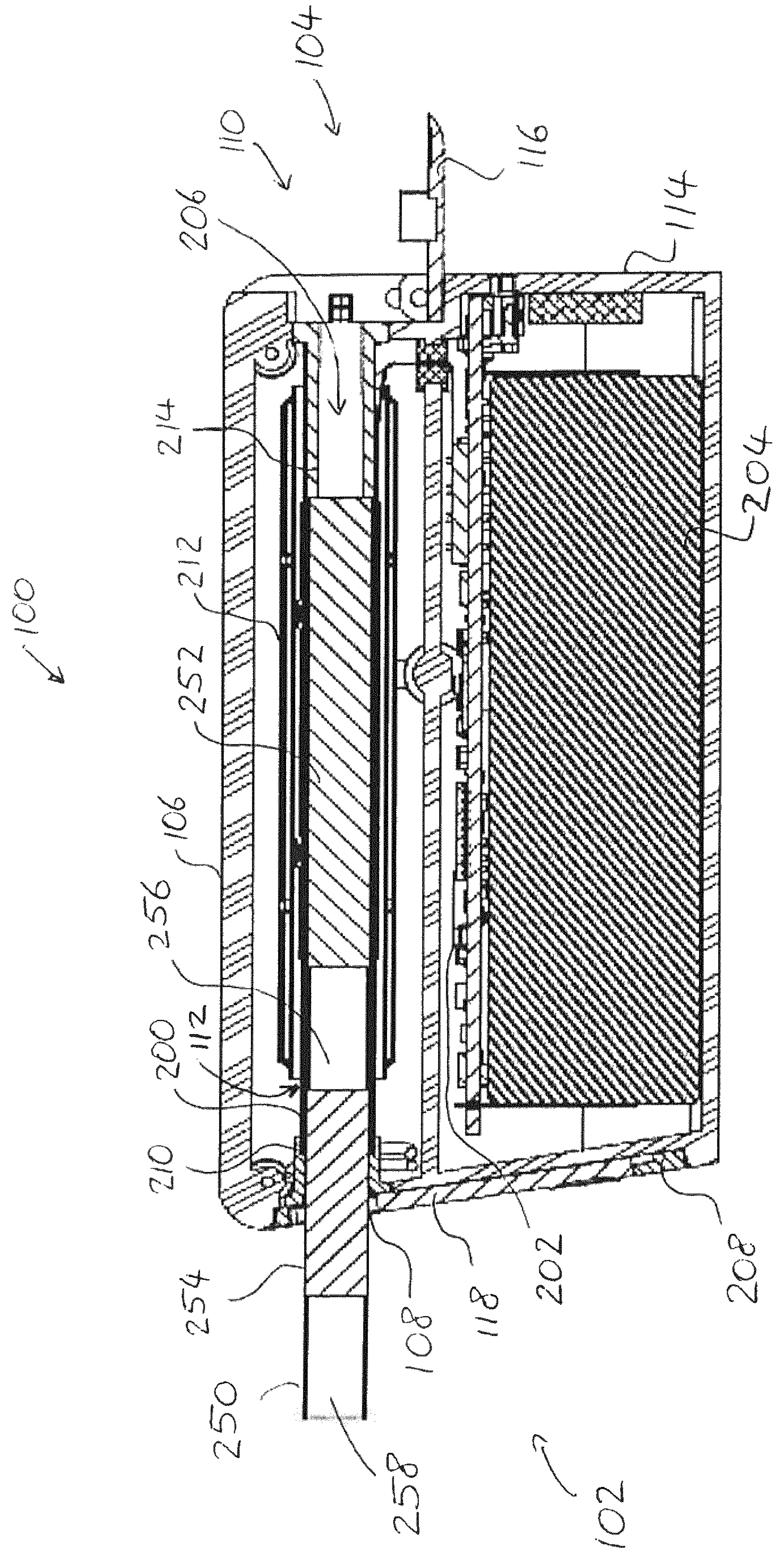
FIG. 3 shows a lateral cross-sectional view of the apparatus of FIG. 1 with smokable material inserted.

Referring to FIGS. 1 to 3, there is shown an example of an apparatus 100 arranged to receive smokable material to enable at least one component of the smokable material to be volatilized. (As will be discussed further below, in some specific examples discussed herein the smokable material is provided as a rod 250 which includes smokable material 252 and optionally other components.) The apparatus 100 has a first or proximal or mouth end 102 and a second or distal end 104.

The apparatus 100 provides a housing 106 for receiving smokable material 252. The housing 106 has at least one opening through which smokable material 252 can pass. In the particular example shown, there are two openings. A first opening 108 is provided to allow smokable material 252 to be introduced into and removed from the housing 106. A second opening 110 is provided to allow a user access to the inside of the housing 106, for example to allow the inside of the housing 106 to be cleaned. In the specific example shown in the drawings, the openings 108, 110 are arranged at the mouth end 102 and distal end 104 respectively. The housing 106 also has a chamber 112 arranged between the mouth end 102 and the distal end 104. As most clearly shown in FIG. 3, the openings 108, 110 are arranged at either end of the chamber 112 in the housing 106. Smokable material 252 is received in the chamber 112 in use. Prior to use a user may insert smokable material 252 through the first opening 108 into the chamber 112. After use, the user may remove the smokable material 252 from the chamber 112 and clean the chamber 112 by inserting for example a pipe cleaner through the second opening 110.

In the example shown, the apparatus 100 has doors or covers 116, 118 to allow the openings 108, 110 to be closed and opened. A hinged cover 116 is pivotally mounted on the housing 106 at the distal end 110 and can move between an open and a closed position (shown in FIGS. 1 and 2 respectively). A slidable cover 118 is mounted on the housing 106 at the proximal end 102 and can slidably move between an open and a closed position. The slide cover 118 is moved to the open position prior to insertion of smokable material 252 into the apparatus 100.

Referring here particularly to FIG. 3, this shows a rod 250 containing smokable material 252 inserted partly through the front opening 108 so that (at least) the smokable material 252 is located within apparatus 100. The rod 250 has at the mouth end, a mouthpiece assembly which includes one or more of a filter for filtering aerosol and/or a cooling element 254 for cooling aerosol. The filter/cooling element 254 is spaced from the smokable material 252 by a space 256 and is also spaced from the mouth end by a further space 258.

The apparatus 100 has located or fixed therein a heater 200, control circuitry 202 and a power source 204. In this example, the heater 200, the control circuitry 202 and the power source 204 are laterally adjacent (that is, adjacent when viewed from an end), with the control circuitry 202 being located generally between the heater 200 and the power source 204, though other locations are possible. The control circuitry 202 may include a controller, such as a microprocessor arrangement, configured and arranged to control the heating of the smokable material 252 as discussed further below. The power source 204 may be for example a battery, which may be a rechargeable battery or a non-rechargeable battery. Examples of suitable batteries include for example a lithium-ion battery, a nickel battery (such as a nickel-cadmium battery), an alkaline battery and/or the like. The battery 204 is electrically coupled to the heater 200 to supply electrical power when required and under control of the control circuitry 202 to heat the smokable material 252 after the smokable material 252 has been inserted through opening 110 into the apparatus 100. An advantage of locating the power source 204 laterally adjacent to the heater 200 is that a physically large power source 204 may be used without causing the apparatus 100 as a whole to be unduly lengthy. As will be understood, in general a physically large power source 204 has a higher capacity (that is, the total electrical energy that can be supplied, often measured in Amp-hours or the like) and thus the battery life for the apparatus 100 can be longer.

In one example, the heater 200 is generally in the form of a hollow cylindrical tube, having a hollow interior heating chamber 206 into which smokable material 252 is inserted for heating in use. Different arrangements for the heater 200 are possible. For example, the heater 200 may be formed of a single heating element or may be formed of plural heating elements aligned along the longitudinal axis of the heater 200. The or each heating element may be annular or tubular, or at least part-annular or part-tubular around its circumference. In an example, the or each heating element may be a thin-film heater. In another example, the or each heating element may be made of a ceramics material. Examples of suitable ceramics materials include alumina and aluminum nitride and silicon nitride ceramics, which may be laminated and sintered. Other heating arrangements are possible, including for example inductive heating, infrared heater elements, which heat by emitting infrared radiation, or resistive heating elements formed by for example a resistive electrical winding. In one particular example, the heater 200 may be made of a substrate with at least one electrically conductive track formed on the substrate. The substrate may be in the form of a sheet and may comprise for example a plastics layer. In a specific example the layer is a polyimide layer. The electrically conductive track may be printed, or otherwise deposited, onto the layer. The heater 200 may have a further plastics layer formed on or over the electrically conductive track. In this example the electrically conductive track is therefore between two plastics layers. The heater 200 is dimensioned so that substantially the whole of the smokable material 252 when inserted is located within the heating element(s) of the heater 200 so that substantially the whole of the smokable material 252 is heated in use. The or each heating element may be arranged so that selected portions of the smokable material 252 can be independently heated, for example in turn (over time) or together (simultaneously) as desired.

The heater 200 in this example is surrounded along at least part of its length by a thermal insulator 212. The insulator 212 helps to reduce heat passing from the heater 200 to the exterior of the apparatus 100. This helps to keep down the power requirements for the heater 200 as it reduces heat losses generally. The insulator 212 also helps to keep the exterior of the apparatus 100 cool during operation of the heater 200. In one example, the insulator 212 may be a double-walled sleeve which provides a low pressure region between the two walls of the sleeve. That is, the insulator 212 may be for example a "vacuum" tube, i.e. a tube that has been at least partially evacuated so as to minimize heat transfer by conduction and/or convection. Other arrangements for the insulator 212 are possible, including using heat insulating materials, including for example a suitable foam-type material, in addition to or instead of a double-walled sleeve.

In the assembled apparatus 100, the heater 200 is generally in the form of a hollow cylindrical tube is located within the housing 106 so that one end of the hollow tube 214 is in fluid communication with the opening 108 at the mouth end 102 and the other end of the hollow tube 214 is in communication with the opening 110 at the distal end 104.

It will be understood that the apparatus 100 shown in FIGS. 1 to 3 and described above is just one example of an apparatus for heating smokable material, and that other arrangements and configurations are possible.

Figure 4:
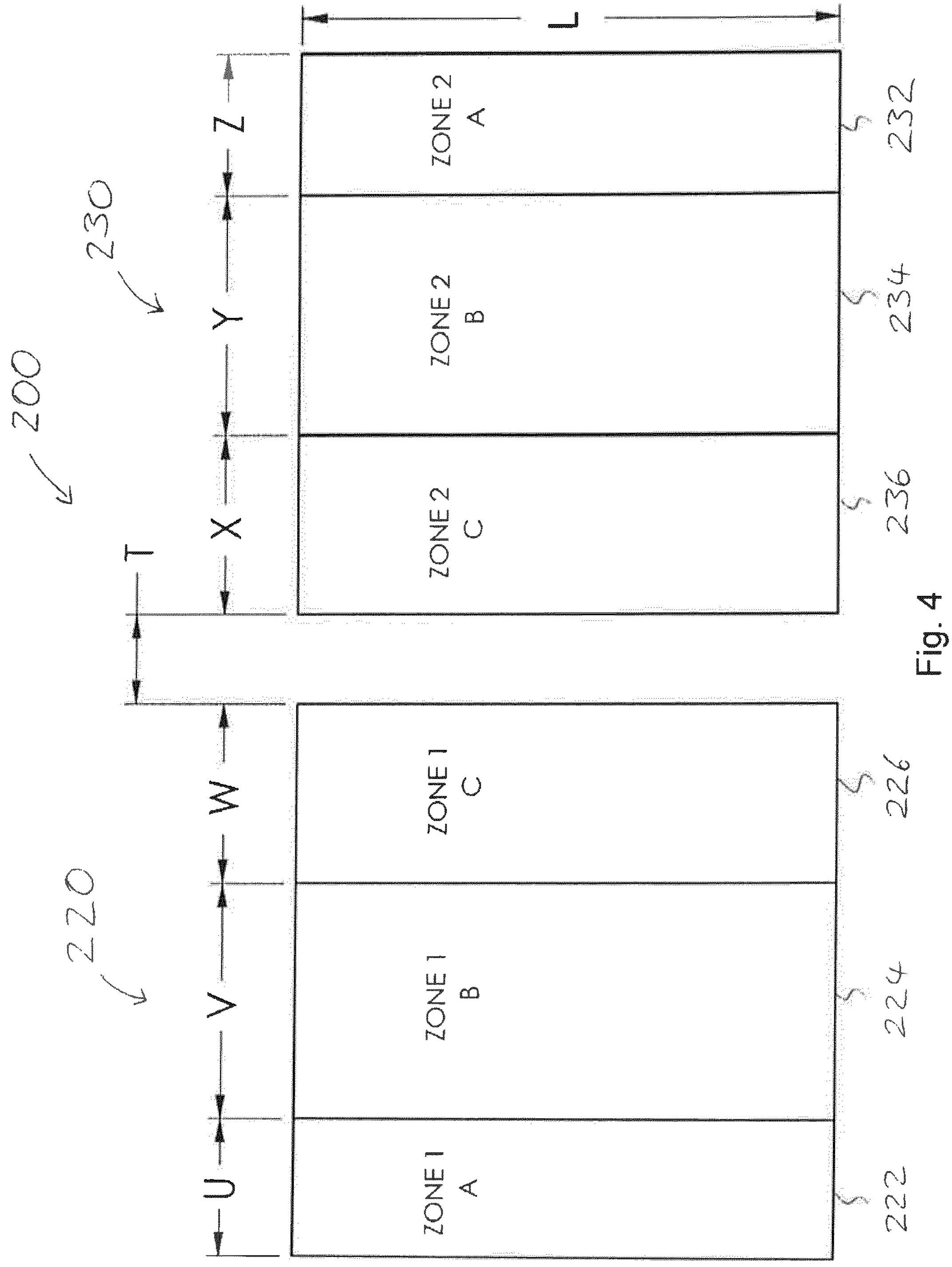
FIG. 4 shows a first schematic plan view of an example of a heater for use in an apparatus for heating smokable material.

Referring now to FIG. 4, there is shown a first schematic plan view of an example of a heater for use in an apparatus for heating smokable material, to illustrate schematically different heating regions and heating zones of this example of the heater. The heater may be used in for example an apparatus 100 of the type shown in FIGS. 1 to 3 and described above, and may be used in other apparatus for heating smokable material.

The heater 200 has a plurality of heating zones for providing heat for volatilizing at least one component of smokable material inserted into the apparatus 100. In the specific example shown the heater 200 has a first heating zone 220 and a second heating zone 230. In other examples the heater 200 may have only one heater zone or more than two heating zones. At least one of the heating zones may be formed so as to provide plural heating regions within the zone for heating different portions of the smokable material.

In particular, in the example shown in FIG. 4, the first heating zone 220 of the heater 200 has a first heating region 222, a second heating region 224 and a third heating region 226. The second heating zone 230 in this example also has a first heating region 232, a second heating region 234 and a third heating region 236. At least the first heating region 222 and the second heating region 224 of the first heating zone 220 of the heater 200 have different watt densities. In other examples all the heating regions of the heater 200 may have different watt densities, or there may be some heating regions that have the same watt density and other heating regions that have different watt densities.

In use, the different watt densities of the heating regions of the heater 200 provide a simple way of ensuring that different heat fluxes act on different portions of the smokable material 252. The heater 200 can therefore for example heat different portions of smokable material 252 in the apparatus 100 to different temperatures. In a specific example, a mouth end portion of the smokable material 252 is heated with a lower heat flux than other portions of the smokable material 252. The lower heat flux can result in more water vapor condensing from the aerosol prior to inhalation by the user. This can reduce the temperature of the aerosol and also reduce the likelihood of the phenomenon known as "hot puff".

The different watt densities of the various heating regions 222, 224, 226, 232, 234, 236 of the heater 200 may be achieved in different ways. For example, the various heating regions 222, 224, 226, 232, 234, 236 may have heating elements having different properties, such as being formed of different materials and/or having different electrical resistances and/or different dimensions (including for example different thicknesses or, more generally, different cross-sectional areas). As another example, the various heating regions 222, 224, 226, 232, 234, 236 may have different heat capacities. Specific examples will be discussed further below.

The heating zones 220, 230 of the heater 200 may have different dimensions (lengths, widths, depths) from one another. In the specific example of FIG. 4, the six heating regions 222, 224, 226, 232, 234, 236 of the heater 200 are of the same length L. However the widths of the regions 222, 224, 226, 232, 234, 236 are not all the same. In this example, the widths U, Z of the first heating region 222 of the first heating zone 220 and the first heating region 232 of the second heating zone 230 may be the same or substantially similar. However, in this example, the widths U, Z of the first heating region 222 of the first heating zone 220 and the first heating region 232 of the second heating zone 230 are different from the widths V, W, X, Y of the other heating regions 224, 226, 234, 236. In some specific examples, the width U may have a range of 5 mm to 6 mm, the width V may have a range of 9 mm to 10 mm, the width W may have a range of 6 mm to 7 mm, the width X may have a range of 6 mm to 7 mm, the width Y may have a range of 9 mm to 10 mm, and the width Z may have a range of 5 mm to 6 mm.

Figure 5:
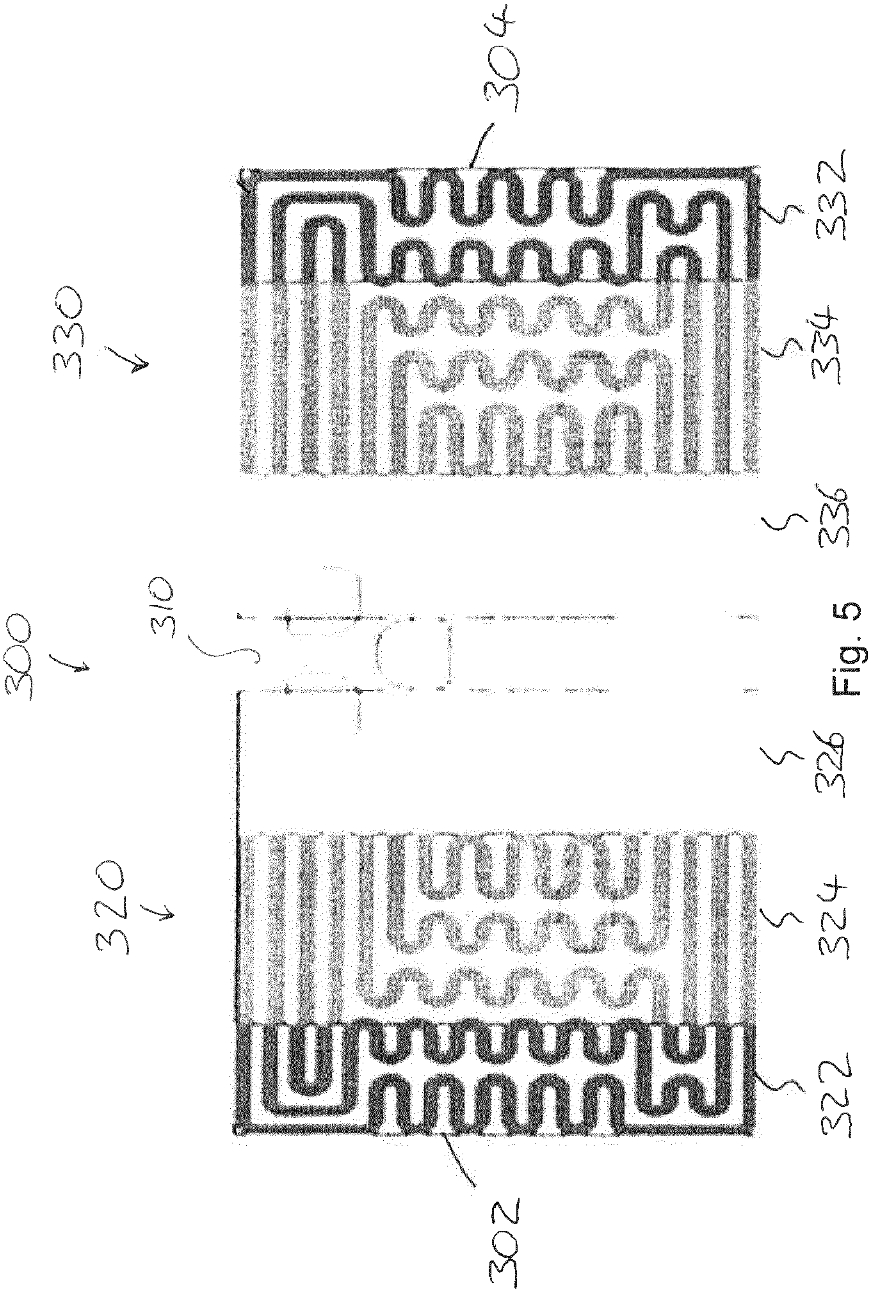
FIG. 5 shows a second schematic plan view of an example of a heater for use in an apparatus for heating smokable material.

Referring now to FIG. 5, the heater 300 may have at least one electrically conductive heating portion. In a specific example shown, the heater 300 has two heating zones 320, 330 and six electrically conductive heating portions 322, 324, 326, 332, 334, 336. In other examples the heater may have greater or fewer heating zones and greater or fewer heating portions. The first heating zone 320 has a first heating portion 322, a second heating portion 324 and a third heating portion 326, and the second heating zone 330 has a first heating portion 332, a second heating portion 334 and a third heating portion 336. (The six electrically conductive heating portions 322, 324, 326, 332, 334, 336 shown schematically in FIG. 5 correspond to the six heating regions 222, 224, 226, 232, 234, 236 shown schematically in FIG. 4.) In an example an electrically conductive heating portion is provided by electrically conducting material. Suitable materials for the electrically conductive heating portion include electrically conductive materials such as metals, ceramics, etc. The electrically conductive material may be in the form of a layer, a trace, one or more elements or one or more wires. The electrically conductive heating portion may be thin metallic traces which are printed onto, or otherwise deposited onto, a polymer substrate, such as a polyimide substrate for example.

An example of the arrangement of the electrically conductive heating portions 322, 324, 326, 332, 334, 336 in the heating zones 320, 330 is shown in FIG. 5. The first heating portion 322 is arranged towards a first end 302 of the heater 300. The second heating portion 324 is arranged away from the first end 302 of the heater 300. In the specific example shown the first heating portion 322 is adjacent the second heating portion 324 in the first heating zone 320, and the third heating portion 326 is adjacent the second heating portion 324 and located towards the center of the heater 300. Also shown is the arrangement of the second heating zone 330. The first heating portion 332 of the second heating zone 330 is arranged towards a second end 304 of the heater 300 with the second heating portion 334 of the second heating zone 330 arranged away from the second end 304 of the heater 300, adjacent the first heating portion 332 with the third heating portion 336 adjacent the second heating portion 334 and located towards the center of the heater 300.

In use, an electric current is passed through the electrically conductive heating portions 322, 324, 326, 332, 334, 336 such that heat is generated to heat the smokable material 252 contained in use in the chamber 112 of the apparatus 100. Given the different watt densities, a varying, non-uniform heat profile is provided to the smokable material 252. This means that for example different portions of the smokable material 252 can be heated to different temperatures. As another example, this means that a flatter, more uniform temperature profile can be achieved across at least part of or the whole of the smokable material 252, which allows for the fact that for example some portions of the smokable material 252 may require more heat than other portions to achieve the same temperature (for example, because of different rates of heat loss at different portions of the portions). The heat flux provided by the heating portions 322, 324, 326, 332, 334, 336 depends on various factors, including for example the electrical resistance of the electrically conductive heating portions 322, 324, 326, 332, 334, 336.

The electrical resistance of one heating portion of the heater 300 may be different from the electrical resistance of another heating portion of the heater 300. In an example, the electrical resistance of the first heating portion 322 of the first heating zone 320 may be different from the electrical resistance of the second heating portion 324 of the second heating zone 330.

At least some of the electrically conductive heating portions 322, 324, 326, 332, 334, 336 may be electrically connected to one another. These portions 322, 324, 326, 332, 334, 336 may be connected in series or in parallel during manufacture depending on the power constraints of the apparatus 100.

In an example, where there are plural heating portions within the first heating zone 320, the plural heating portions may be connected in series with each other. Likewise, where there are plural heating portions within the second heating zone 330, they may be connected in series with each other. That is, in the specific example shown in the drawings, the heating portions 322, 324, 326 within the first heating zone 320 may be connected in series with each other, and the heating portions 332, 334, 336 within the second heating zone 330 may be connected in series with each other. In each case, this may be obtained by for example there being a single continuous electrically-conductive heating element for the heating portions 322, 324, 326 within the first heating zone 320, and a single continuous electrically-conductive heating element for the heating portions of the second heating zone 330.

In use, the power source 204 of the apparatus 100 provides a voltage to be applied across the heater. In the heater 300 shown in FIG. 5, the same voltage is applied across the two heating zones 320, 330 from the one power source 204. The particular voltage drop across any of the individual heating portions 322, 324, 326, 332, 334, 336 will be proportional to the electrical resistance of that portion. The heat flux generated by that portion is related to this voltage drop. The heater 300 therefore provides a varied heating profile to smokable material 252 based on the electrical resistances of the heating portions 322, 324, 326, 332, 334, 336 and the voltage of the one power source 204.

Table 1 below shows details including the electrical resistance and the watt density for the heating portions for a specific example of the heater 300, to illustrate an example of the different properties that are available. The electrical resistance of two electrically conductive heating portions may differ if, for example, the cross-sectional areas of those electrically conductive heating portions are different. A smaller cross-sectional area of the first heating portion 322 results in a higher electrical resistance of that portion 322 and the heat flux of the first heating portion 322 will be greater. In another example, the electrical resistances of the first and second heating portions 322, 324 of the first heating zone 320 are different because the length of the first heating portion 322 is longer than the length of the second heating portion 324. The longer the heating portion is, the greater the resistance of that heating portion and therefore the higher temperature at which the heater can operate. Operating temperatures of the heater 200 range from for example 150° C. to 250° C., with the maximum temperature for continuous heating for a particular heating zone being around 255° C. The maximum temperature for short periods (of less than one second) for a particular heating zone is around 260° C.

TABLE 1

| Heating Portion | Area of Portion ($mm^2$) | Power Generated by Portion (W) | Watt Density of Portion ($W/mm^2$) | Voltage Drop Across Portion (V) | Electrical Resistance of Portion (Ω) | Trace Coverage of Portion (%) |
|---|---|---|---|---|---|---|
| Zone 1 A (222) | 79.1 | 3.31 | 0.042 | 1.010 | 0.3651 | 67.4 |
| Zone 1 B (224) | 133.7 | 4.56 | 0.034 | 1.515 | 0.5030 | 61.3 |
| Zone 1 C (226) | 100.3 | 3.27 | 0.033 | 1.086 | 0.3607 | 69.3 |
| Zone 2 A (232) | 79.1 | 3.07 | 0.039 | 1.042 | 0.3537 | 57.2 |
| Zone 2 B (234) | 133.7 | 4.56 | 0.034 | 1.548 | 0.5254 | 59.3 |
| Zone 2 C (236) | 100.3 | 3.27 | 0.033 | 1.110 | 0.3768 | 71.1 |

The apparatus 100 may have a component the resistance of which varies in relation to changes in temperature. This component may act as a temperature controller for controlling the temperature of one or more of the heating portions, and may for example be part of or associated with the control circuitry 202 of the apparatus 100. In a specific example the temperature controller controls the temperature of the first heating portion 322 of the first heating zone 320. The resistance of the temperature controller changes with temperature and as such the voltage across the heating portion 322 will change. This, in turn, will alter the voltage across the other heating portions 324, 326, 332, 334, 336 in the heater 300. Heating portion 322 in this example therefore acts as a “master” heating portion while the other heating portions 324, 326, 332, 334, 336, which have their heat output varied as a result of changes of temperature in the “master” portion, act as “slave” portions. The temperature controller may be for example a positive temperature coefficient (PTC) or a negative temperature coefficient (NTC) type thermistor or a resistance temperature detector (RTD).

An advantage of this is that only a simple power supply with a simple control is required and yet a non-uniform heating profile along the smokable material can be achieved. In effect, only one power supply is needed which provides the same current through each heating portion 322, 324, 326 of the first heating zone 320 and through each heating portion 332, 334, 336 of the second heating zone 330. The current that is supplied is controlled by simply monitoring the temperature of one heating portion 322. The temperature of that one heating portion 322 is controlled and the temperatures of the other heating portions 324, 326, 332, 334, 336 “automatically” follow that. This is achieved with relatively simple hardware and avoids complicated software control or the like, which reduces costs and improves reliability.

Referring again to FIGS. 4 and 5, in this example the heater 200 has a non-heating region 310. The non-heating region 310 has a width T. Width T may be for example 2 mm to 3 mm. In the specific example shown the non-heating region 310 is arranged generally centrally of the heater 200 between the two heating zones 320, 330. The non-heating region 310 may be provided by a heat insulating surface arranged above the electrically-conductive element(s). Alternatively, there may be a gap between the third heating portion 326 of the first heating zone 320 and the third heating portion 336 of the second heating zone 330. In this example the gap may act as a non-heating region 310 and, although the heater 300 is a single, unitary heater 300, the heater 300 has two separate heating zones 320, 330, which may have different profiles for the watt density as discussed in detail earlier and as shown in Table 1.

The heater element area may be covered by an outer dielectric layer, such as for example PEEK (polyether ether ketone) shrink tubing. The dielectric layer helps prevent the temperature controller or sensor (if provided) from shorting to metal components, such as for example the “vacuum” insulator 212 mentioned above. The dielectric layer also applies external pressure to the heater and keeps it in tight contact with the internal stainless steel support tube mentioned above.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. An apparatus arranged to heat smokable material to volatilize at least one component of the smokable material, the apparatus comprising:

a mouth end with an opening allowing the smokable material to be introduced into the opening;

a distal end opposite the mouth end; and at least one thin-film heater constructed and arranged to heat the smokable material contained in use within the apparatus, the at least one thin-film heater having a plurality of heating regions for heating different portions of the smokable material contained in use within the apparatus, wherein a first heating region of the at least one thin-film heater is arranged at a first end of the at least one thin-film heater and is configured to provide a lower watt density to the smokable material than a second heating region of the at least one thin-film heater, wherein the first heating region is closer to the first end of the at least one thin-film heater than any other heating region of the plurality of heating regions;

wherein the first heating region has a plurality of first electrically conductive heating portions which are electrically connected in series;

wherein the second heating region has a plurality of second electrically conductive heating portions which are electrically connected in series, the apparatus further comprising a power supply which is arranged to provide the same voltage to the first heating region and the second heating region;

wherein the first heating region is arranged towards the mouth end; and wherein the apparatus comprises a resistive component, the resistance of which varies in relation to changes in its temperature, wherein the resistive component acts as a temperature controller for controlling the temperature of one or more of the first or second electrically conductive heating portions.

2. The apparatus according to claim 1, wherein an electrical resistance of the plurality of first electrically conductive heating portions is different from an electrical resistance of the plurality of second electrically conductive heating portions.

3. The apparatus according to claim 2, wherein a cross-sectional area of the plurality of first electrically conductive heating portions is different from a cross-sectional area of the plurality of second electrically conductive heating portions.

4. The apparatus according to claim 1, wherein an electrical resistance of at least one of the plurality of first electrically conductive heating portions of the first heating region is different from an electrical resistance of at least one of the plurality of second electrically conductive heating portions of the second heating region.

5. The apparatus according to claim 1, wherein the at least one thin-film heater has a non-heating region arranged generally centrally of the at least one thin-film heater, the non-heating region provided by a heat insulating surface arranged adjacent to at least one of the plurality of first electrically conductive heating portions or the plurality of second electrically conductive heating portions.

6. The apparatus according to claim 1, further comprising the smokable material in the form of a solid, wherein the at least one thin-film heater is constructed and arranged to heat the smokable material contained within the apparatus, the at least one thin-film heater having the plurality of heating regions for heating different portions of the smokable material contained within the apparatus, wherein the smokable material is in the form of or provided as part of a rod, a cartridge, or a cassette.

7. The apparatus according to claim 6, wherein the smokable material is in the form of or provided as part of a rod.

8. The apparatus according to claim 1, wherein the at least one thin-film heater is a hollow cylindrical tube having a hollow interior heating chamber into which the smokable material is inserted for heating in use.

9. The apparatus according to claim 8, wherein the at least one thin film heater is surrounded along at least part of its length by a thermal insulator, and the thermal insulator comprises:

a double-walled sleeve; and/or a foam-type material.

10. The apparatus according to claim 9, wherein the thermal insulator is adjacent to the at least one thin film heater.

11. An apparatus arranged to heat smokable material to volatilize at least one component of the smokable material, the apparatus comprising:

the smokable material in the form of or provided as part of a solid rod;

a mouth end with an opening allowing the smokable material to be introduced into the opening;

a distal end opposite the mouth end; and at least one thin-film heater constructed and arranged to heat the smokable material contained in use within the apparatus, the at least one thin-film heater having a plurality of heating regions for heating different portions of the smokable material contained in use within the apparatus, wherein a first heating region of the at least one thin-film heater is arranged at a first end of the at least one thin-film heater and is configured to provide a lower watt density to the smokable material than a second heating region of the at least one thin-film heater;

wherein the first heating region is closer to the first end of the at least one thin-film heater than any other heating region of the plurality of heating regions;

wherein the first heating region has a plurality of first electrically conductive heating portions which are electrically connected in series;

wherein the second heating region has a plurality of second electrically conductive heating portions which are electrically connected in series, the apparatus further comprising a power supply which is arranged to provide the same voltage to the first heating region and the second heating region;

wherein the first heating region is arranged towards the mouth end; and wherein the apparatus is configured such that, in use of the apparatus, the solid rod is located partly within the opening of the mouth end of the apparatus and partly outside the apparatus.

12. The apparatus according to claim 11, wherein the at least one thin-film heater is a hollow cylindrical tube having a hollow interior heating chamber into which at least part of the solid rod is inserted for heating in use.

13. An apparatus arranged to heat smokable material to volatilize at least one component of the smokable material, the apparatus comprising:

a mouth end with an opening allowing the smokable material to be introduced into the opening;

a distal end opposite the mouth end; and at least one thin-film heater constructed and arranged to heat the smokable material contained in use within the apparatus, the at least one thin-film heater having a plurality of heating regions for heating different portions of the smokable material contained in use within the apparatus, wherein a first heating region of the at least one thin-film heater is arranged at a first end of the at least one thin-film heater and is configured to provide a lower watt density to the smokable material than a second heating region of the at least one thin-film heater, wherein the first heating region is closer to the first end of the at least one thin-film heater than any other heating region of the plurality of heating regions;

wherein the first heating region has a plurality of first electrically conductive heating portions which are electrically connected in series;

wherein the second heating region has a plurality of second electrically conductive heating portions which are electrically connected in series, the apparatus further comprising a power supply which is arranged to provide the same voltage to the first heating region and the second heating region;

wherein the first heating region is arranged towards the mouth end; and wherein the at least one thin film heater has a non-heating region arranged generally centrally of the at least one thin-film heater, the non-heating region provided by:

a gap between a pair of the plurality of first electrically conductive heating portions; and/or a gap between a pair of the plurality of second electrically conductive heating portions; and/or a gap between one of the plurality of first electrically conductive heating portions and one of the plurality of second electrically conductive heating portions.

14. An apparatus arranged to heat smokable material to volatilize at least one component of the smokable material, the apparatus comprising:

a mouth end with an opening allowing the smokable material to be introduced into the opening;

a distal end opposite the mouth end; and at least one thin-film heater constructed and arranged to heat the smokable material contained in use within the apparatus, the at least one thin-film heater having a plurality of heating regions for heating different portions of the smokable material contained in use within the apparatus, wherein a first heating region of the at least one thin-film heater is arranged at a first end of the at least one thin-film heater and is configured to provide a lower watt density to the smokable material than a second heating region of the at least one thin-film heater;

wherein the first heating region is closer to the first end of the at least one thin-film heater than any other heating region of the plurality of heating regions;

wherein the first heating region has a plurality of first electrically conductive heating portions which are electrically connected in series;

wherein the second heating region has a plurality of second electrically conductive heating portions which are electrically connected in series, the apparatus further comprising a power supply which is arranged to provide the same voltage to the first heating region and the second heating region;

wherein the first heating region is arranged towards the mouth end;

wherein the at least one thin-film heater is a hollow cylindrical tube having a hollow interior heating chamber into which the smokable material is inserted for heating in use; and wherein the at least one thin film heater is surrounded along at least part of its length by a thermal insulator, and the thermal insulator comprises a vacuum tube.

15. An apparatus arranged to heat smokable material to volatilize at least one component of the smokable material, the apparatus comprising:

a mouth end with an opening allowing smokable material to be introduced into the opening;

a distal end opposite the mouth end; and at least one thin-film heater constructed and arranged to heat the smokable material contained in use within the apparatus, the at least one thin-film heater having a plurality of heating regions for heating different portions of the smokable material contained in use within the apparatus, wherein a first heating region of the at least one thin-film heater is arranged at a first end of the at least one thin-film heater and is configured to provide a lower watt density to the smokable material than a second heating region of the at least one thin-film heater, wherein the first heating region is closer to the first end of the at least one thin-film heater than any other heating region of the plurality of heating regions;

wherein the first heating region has a plurality of first electrically conductive heating portions which are electrically connected in series; and wherein the second heating region has a plurality of second electrically conductive heating portions which are electrically connected in series, the apparatus further comprising a power supply which is arranged to provide the same voltage to the first heating region and the second heating region;

wherein the first heating region is arranged towards the mouth end; and wherein the apparatus comprises a slidable cover mounted on the mouth end of the apparatus, the slidable cover operable to slidably move between an open position and a closed position, wherein the open position allows insertion of the smokable material into the apparatus, and the closed position prevents insertion of the smokable material into the apparatus.

* * * * *